April 4, 1939.    S. J. STRID    2,153,440
COTTER PIN
Filed April 10, 1937
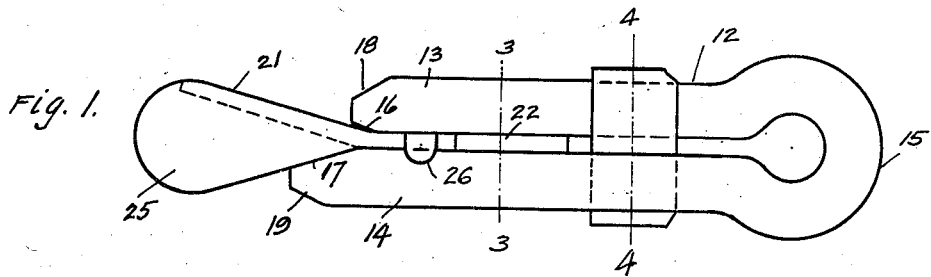
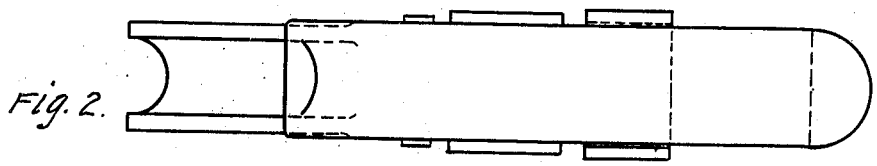
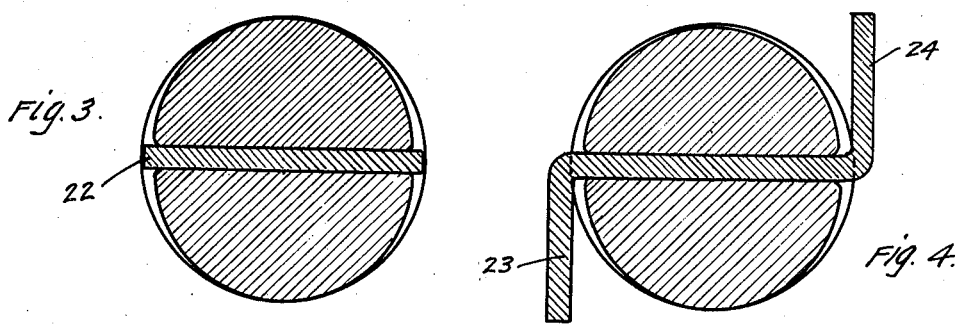
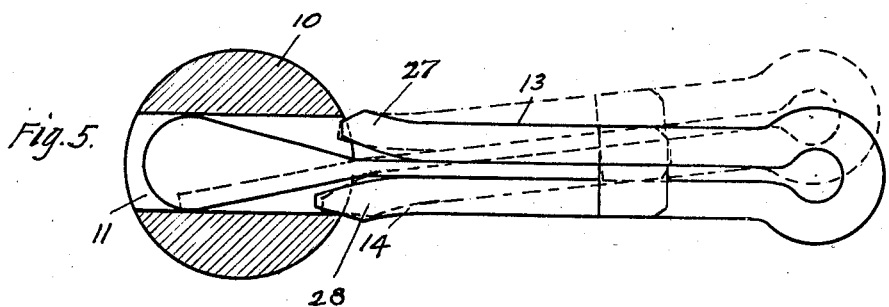
INVENTOR.
SVEN J. STRID
BY
ATTORNEYS.

Patented Apr. 4, 1939

2,153,440

UNITED STATES PATENT OFFICE 2,153,440

COTTER PIN

Sven J. Strid, Chicago, Ill., assignor to T & S Corporation, Chicago, Ill., a corporation of Illinois Application April 10, 1937, Serial No. 136,170

5 Claims. (Cl. 85—8.5)

This invention relates to cotter pins and means for holding the same in position while in use.

One of the objects of the invention is the provision of a new and improved cotter pin having novel means whereby the pin may be removed and attached a number of times, if desired.

Another object of the invention is the provision of a new and improved cotter pin and spreader device that when in use will make a snug fit in a circular opening whereby wear and rattling are minimized.

A further object of the invention is the provision of a new and improved cotter pin and spreader device that is simple in construction, efficient in use, inexpensive to manufacture, easily and readily applied, and that may be re-applied with ease and facility.

Other and further objects and advantages of the invention will appear from the following description taken in connection with the accompanying drawing, in which Fig. 1 is a side elevation of the cotter pin assembly;

Fig. 2 is a plan view of the construction shown in Fig. 1;

Fig. 3 is a section on the line 3—3 of Fig. 1;

Fig. 4 is a section on the line 4—4 of Fig. 1; and

Fig. 5 is a cross-section of a rod or bolt showing a used cotter pin assembly in position to be driven through an opening through the rod or bolt.

In the use of spreader devices in combination with the conventional cotter pins, it is extremely difficult if not impossible to reuse a cotter pin and spreader device after the first application because of the difficulty in inserting the arms of the pin in the opening in which it is desired to use the same due to the permanent distortion of the arms of the pin during its first use.

The ends of the pin must be rugged and strong for retaining the pin in the opening, otherwise the distorted portion will be too easily straightened.

Referring now to the drawing, the reference character 10 designates a rod or bolt having an opening 11 therethrough and in which the cotter pin assembly is adapted to engage for preventing the loss or withdrawal of the bolt or rod as is usual in such constructions.

The cotter pin is shown at 12 and comprises a pair of arms 13 and 14 connected by the loop 15 as is usual in such constructions. The cotter pin is made from stock semi-circular in cross-section as indicated more clearly in Figs. 3 and 4. The free ends of the arms 13 and 14 are beveled on their inner sides as at 16 and 17 and on their outer sides as at 18 and 19, respectively. The arm 13 is materially shorter than the arm 14, as shown in Fig. 1, for facilitating the insertion of the pin in the opening 11 after the pin has been previously applied to the bolt and removed, as will presently appear.

Suitable means are provided for automatically spreading the outer ends of the arms when the pin is inserted in the opening 11. Any suitable means may be employed for this purpose. In the form of the construction selected to illustrate one embodiment of the invention, a spreader member 21 is employed for this purpose. The body portion 22 of the spreader member 21 is provided at each side thereof at, what for convenience of description will be termed, its inner end with wings or shoulder members 23 and 24 which are bent at right angles to the body portion to position the spreader member between the arms. The shoulders will form abutments for holding the wedge member while the pin is being inserted in position in the hole 11. The outer end of the wedge member 21 is bent to form a wedge portion 25 which is adapted to be forced between the outer ends of the cotter pin arms for distorting the same in the usual manner.

Positioning members, such as the tabs 26, may be provided on the edges of the body portion 22 of the spreader member between the wings or shoulders 23 and 24 and the wedge portion 25 for preventing the lateral movement of the spreader member relative to the arms 13 and 14 during shipment and while the pin is being applied. These tabs may be made by simply striking the edge of the spreader member with a hammer, or the like, causing a distortion of the metal at the edges of the body portion of the spreader member to form these shoulders.

Since the pin is made from stock semi-circular in cross-section, it is evident that when the spreader member is inserted between the arms, the pin will no longer be circular in cross-section but will have one diameter greater than the other so that when the pin is inserted in an opening, it will loosely engage the opening and will have more or less movement in the same thereby causing wear and rattling of the parts. In order to overcome this difficulty, the body portion 22 of the wedge member is of a greater width than the diameter of the pin so that when the same is inserted, the width of the spreader member will equal the diameter of the pin plus the thickness of the spreader member. As a result of this construction, the pin and spreader member may be inscribed in a circle and consequently, when inserted in an opening bua slightly larger than the pin, the looseness and rattling of the parts will be prevented.

In applying the cotter pin, the wedge portion of the spreader member and the outer ends of the arms are inserted in the opening until the shoulders or wings 23 and 24 come in contact with the member through which the pin is being inserted. One or more blows of a hammer are then applied to the loop portion 15 which will drive the cotter pin through the bolt or rod 10 and simultaneously spread the ends of the cotter pin for preventing the withdrawal of the pin.

Sometimes, it happens that it is desirable to withdraw the pin and reuse the same in the same or in other relations. After the pin is withdrawn, the outer ends of the arms will be more or less distorted and remain spread apart as shown at 27 and 28 and have the position shown in Fig. 5. By extending the arm 14 a material distance beyond the end of the arm 13 and beveling the two arms on their outer sides, the pin may be very easily reinserted even after it has been used once. In inserting the reused pin, the same is moved to the position shown in dotted lines in Fig. 5 and partly inserted in the opening as shown in said figure, after which it may be struck one or more blows with a hammer which will move the pin to the full line position and force the same through the opening, as in the previous construction.

It will thus be seen that by the simple expedient of extending one arm materially beyond the other and beveling the outer sides of the ends thereof, the assembly may be removed and reused, if desired. Heretofore, considerable difficulty has been experienced in the reuse of these devices because of their distorted ends being spaced apart so that the diameter through these distorted portions is greater than the diameter of the opening. It will also be apparent that with the use of a spreader that is as wide as the diameter of the pin plus the thickness of the spreader, a snug fit of the assembly in an opening is assured.

It is thought from the foregoing taken in connection with the accompanying drawing that the construction and operation of my device will be apparent to those skilled in the art, and that changes in size, shape, proportion and details of construction may be made without departing from the spirit and scope of the appended claims.

I claim as my invention:

1. In a cotter pin assembly, a pin having two arms in juxtaposition and connected by a loop portion, the free ends of said arms being beveled on their inner and outer sides and one arm materially longer than the other, said cotter pin being made from half round stock with the flat sides adjacent each other, a spreader member between said arms and having a wedge portion engaging the inner beveled surfaces of said arms, the overall width of said spreader member being substantially the same as the diameter of said pin plus the thickness of the body portion of said spreader, and limiting shoulders on said spreader member for causing relative movement of said pin and spreader member while said pin is being applied.

2. In a cotter pin assembly, a cotter pin having arms semi-circular in cross-section with their flat sides turned toward each other, the free end of each arm being beveled on its outer and inner sides, a spreader member comprising a body portion of greater width than the diameter of said pin and the diameter of said pin plus the thickness of the spreader member taken through said spreader member being at least as great as the width of said spreader member and positioned between said arms, said member having limiting shoulders on its inner end and having a wedge shaped outer end in engagement with the end of said pin for spreading said arms.

3. In a cotter pin assembly, a pin comprising a pair of arms connected together by a loop portion, one of said arms being materially longer than the other, the free ends of said arms being slightly spread apart and beveled at their inner and outer sides, and a spreader member between said arms having shoulders extending laterally outwardly at one end and a wedge portion at the other end with the thin portion of the wedge on the side toward the shoulders.

4. In a cotter pin assembly, a pin comprising a pair of arms connected together by a loop portion, one of said arms being materially longer than the other, the free ends of said arms being beveled at both their inner and outer sides and slightly distorted and spaced apart, a spreader member between said arms, said spreader being wider than the diameter of said pin and having laterally extending shoulders at one end and a wedge portion pointing inwardly at its other end, and positioning members on each edge of said spreader member between said shoulders and the point of said wedge portion for preventing lateral movement of said spreader member relative to said arms.

5. In a cotter pin assembly, a pin comprising a pair of arms beveled at their ends on their outer sides and one arm materially longer than the other, the outer ends of said arms being distorted by the ends of said arms being spread apart, and a spreader member between said arms, said spreader member being wider than the diameter of said pin and comprising shoulders on one end portion and a wedge member on the other, whereby said pin may be inserted in an opening by tilting the pin and striking it one or more blows and the ends of said arms spread for retaining the pin in position within said opening, said arms except for the distorted ends being substantially parallel when said spreader member is in position therebetween.

SVEN J. STRID.